(No Model.)

D. CROUGH.
CLOVER SEED ATTACHMENT FOR MOWERS.

No. 532,363. Patented Jan. 8, 1895.

Witnesses.
W. J. Withrow.
H. S. Young.

Inventor.
Daniel Crough.
by Fetherstonhaugh & Co.
Attys

UNITED STATES PATENT OFFICE.

DANIEL CROUGH, OF ENNISMORE, CANADA.

CLOVER-SEED ATTACHMENT FOR MOWERS.

SPECIFICATION forming part of Letters Patent No. 532,363, dated January 8, 1895.

Application filed November 6, 1894. Serial No. 528,049. (No model.)

*To all whom it may concern:*

Be it known that I, DANIEL CROUGH, farmer, of the township of Ennismore, in the county of Peterborough, in the Province of Ontario, Canada, have invented certain new and useful Improvements in Clover-Seed Attachments for Mowers, of which the following is a specification.

My invention relates to improvements in clover seed attachments for mowers and the object of the invention is to provide such a device that will enable the vine of peas or clover seed stalks to be drawn clear of the cutter bar of the mower and the shelled clover seed or peas as the case may be retained and prevented from passing rearwardly on to the ground with the vine or stalks and it consists essentially of an inclined table suitably secured at the front to the mower bar and having secured to it a rearwardly extending box or receptacle provided with an open slatted top hinged beneath the rear of the table and extending back over and supported upon the rear end of the box, so as to enable the pea vines or clover seed stalks to be drawn over the rear of the box, supporting wheels being provided for the box and the device being otherwise arranged and constructed in the manner hereinafter more particularly explained.

Figure 1:
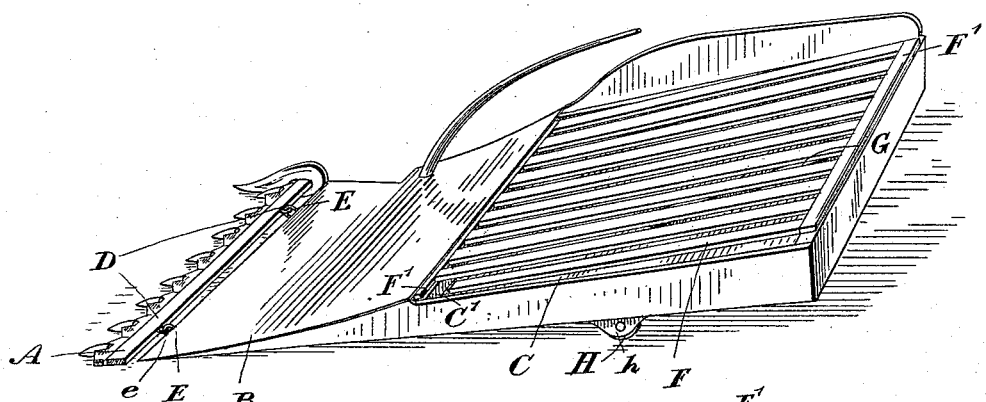
Figure 2:
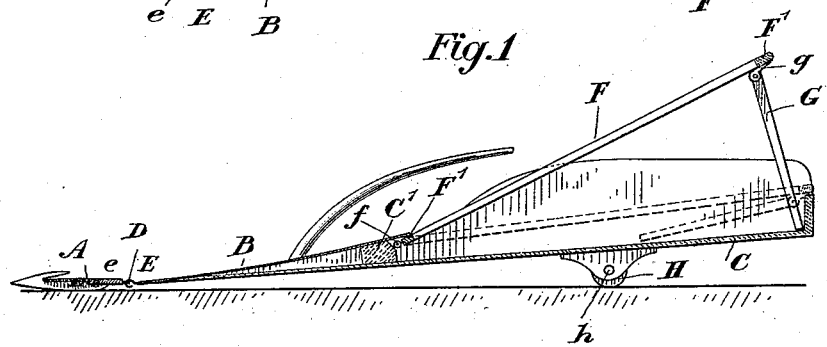

Figure 1, is a perspective view of my clover seed collecting attachment attached to the cutter bar of the mower. Fig. 2, is a longitudinal section through Fig. 1.

In the drawings like letters of reference indicate corresponding parts in each figure.

A, is the cutter bar of the mower.

B, is a rearwardly extending table, which has attached to or forming part of it the rearwardly extending box, C.

D, are two screw eyes extending into the back of the finger bar, A, and, E, are two rods bent both the same way and designed to be slipped through the screw eyes, so as to secure the table to the cutter bar. A split pin, e, is inserted through the end of one of the rods, so as to retain them in position in the eyes, D.

C', is a cross piece forming the front end of the box or receptacle, C, and also a means to support the rear end of the table, B.

F, is an open slatted top, the slats of which are secured in the end bars, F'. The front end bar, F' is connected by the hinges, f, to the cross bar, C'.

G, is a support hinged at, g, to the rear end bar, F', and designed to support the slatted top up in the position shown in Fig. 2, so as to enable the shelled peas or seed to be readily shoveled out of the box, C, when a sufficient amount is collected. The normal position, however, of the slatted top, F, is as shown in full lines in Fig. 1, and dotted lines in Fig. 2.

H are supporting wheels, which are journaled in bearing brackets, h, secured to the bottom of the box. I preferably provide two wheels although only one is shown in Fig. 1 the other being at the opposite side and shown in Fig. 2. I also preferably extend the outer side of the box upwardly, so as to prevent the clover seed from passing beyond the swath being cut.

It will be seen that the man following the attachment may by his rake readily draw the peas or clover seed directly rearwardly over the smooth table after being cut by the knife. The swath will pass over the smooth table and carry with it the seed. The swath as it is being carried directly backwardly will be freed from the shelled seed, which will drop through the slatted top into the box from which it can be removed at any convenient time.

By the attachment such as I describe it will be seen that there will be no danger of the clover seed swath sticking close to the mower bar but it may be readily carried back so as to precipitate the shelled seed or peas into the receiving box.

What I claim as my invention is—

1. The combination with a cutter bar of a mower, of a rearwardly extending upwardly inclined table, a box or receptacle secured to the rear of the table and an inclined slatted top extending rearwardly from the table and supported upon the front and rear ends of the box and means for connecting the attachment to the mover bar and supporting it clear of the ground as and for the purpose specified.

2. The combination with a cutter bar of a mower, of a rearwardly extending upwardly inclined table, a box or receptacle secured to the rear of the table and an inclined slatted top extending rearwardly from the table and supported upon the front and rear ends of the box and the wheels, H, journaled in bearings beneath the box as and for the purpose specified.

3. The combination with the cutter bar, A, inclined table, B, attached thereto, box or receptacle secured to and extending behind the rear of the table and the slatted top provided with end bars, the front bar of which is hinged beneath the rear end of the table and the rear bar of which has attached to it a folding support, G, as and for the purpose specified.

4. The combination with a mower bar having screw eyes to the rear of the bar, of a rearwardly extending upwardly inclined table having hooks on the front thereof designed to fit into the eyes in the mower bar, a box or receptacle extending rearwardly from the table and an open slatted top for the box extending rearwardly from the table as and for the purpose specified.

DANIEL CROUGH.

Witnesses:
J. BILLINGTON,
J. ANDERSON.